United States Patent
Peng et al.

(10) Patent No.: US 11,757,350 B2
(45) Date of Patent: *Sep. 12, 2023

(54) POWER CONVERTER WITH OVER TEMPERATURE PROTECTION COMPENSATION

(71) Applicant: Chicony Power Technology Co., Ltd., New Taipei (TW)

(72) Inventors: Tso-Jen Peng, New Taipei (TW); Ssu-Hao Wang, New Taipei (TW)

(73) Assignee: CHICONY POWER TECHNOLOGY CO., LTD., New Taipei (TW)

(*) Notice: Subject to any disclaimer, the term of this patent is extended or adjusted under 35 U.S.C. 154(b) by 55 days.

This patent is subject to a terminal disclaimer.

(21) Appl. No.: 17/327,622

(22) Filed: May 21, 2021

(65) Prior Publication Data

US 2021/0273555 A1   Sep. 2, 2021

Related U.S. Application Data

(63) Continuation of application No. 16/738,885, filed on Jan. 9, 2020, now Pat. No. 11,050,341.

(Continued)

(30) Foreign Application Priority Data

Nov. 8, 2019   (TW) .................................. 108140705

(51) Int. Cl.
*H02M 1/32*   (2007.01)
*H02M 3/335*   (2006.01)

(52) U.S. Cl.
CPC ......... *H02M 1/32* (2013.01); *H02M 3/33507* (2013.01); *H02M 1/327* (2021.05)

(58) Field of Classification Search
CPC ....... H02M 1/32; H02M 3/335–33592; H02M 1/327

See application file for complete search history.

(56) References Cited

U.S. PATENT DOCUMENTS 7,149,098 B1 * 12/2006 Chen ....................... H02M 1/32
   363/21.13
11,050,341 B2 * 6/2021 Peng ................. H02M 3/33507
(Continued)

FOREIGN PATENT DOCUMENTS

| CN | 103825466 A | 5/2014 |
| CN | 109217677 A | 1/2019 |

(Continued)

OTHER PUBLICATIONS

Office Action dated Nov. 18, 2021 of the corresponding Taiwan patent application No. 110102649.

*Primary Examiner* — Rafael O De Leon Domenech
(74) *Attorney, Agent, or Firm* — Chun-Ming Shih; HDLS IPR SERVICES

(57) ABSTRACT

A power converter with over temperature protection compensation includes a main conversion unit, a primary-side control unit, a primary detection circuit, and an over temperature adjustment circuit. The primary-side control unit obtains a primary voltage change value through the primary detection circuit, and the primary-side control unit correspondingly provides a current change value to the over temperature adjustment circuit according to the primary voltage change value. The over temperature adjustment circuit provides a temperature control voltage according to the current change value so that the primary-side control unit determines whether an over temperature protection is activated according to the temperature control voltage.

14 Claims, 9 Drawing Sheets

Related U.S. Application Data

(60) Provisional application No. 62/800,048, filed on Feb. 1, 2019.

(56) References Cited

U.S. PATENT DOCUMENTS

| | | | | |
|---|---|---|---|---|
| 2018/0287409 | A1* | 10/2018 | Cheng | H02M 1/32 |
| 2020/0014304 | A1* | 1/2020 | Chang | H02M 3/33569 |
| 2020/0021200 | A1* | 1/2020 | Medina-Garcia | H02M 3/33571 |

FOREIGN PATENT DOCUMENTS

| | | |
|---|---|---|
| TW | 201624898 A | 7/2016 |
| TW | 201643583 A | 12/2016 |

\* cited by examiner

POWER CONVERTER WITH OVER TEMPERATURE PROTECTION COMPENSATION

CROSS-REFERENCE TO RELATED APPLICATIONS

This application is a continuing application of U.S. patent application Ser. No. 16/738,885, filed on Jan. 9, 2020, and entitled "POWER CONVERTER WITH OVER TEMPERATURE PROTECTION COMPENSATION", which claims the benefit of U.S. provisional patent application No. 62/800,048, filed Feb. 1, 2019. The entire disclosures of the above applications are all incorporated herein by reference.

BACKGROUND

Technical Field

The present disclosure relates to a power converter with over temperature protection compensation, and more particularly to a power converter with over temperature protection compensation disposed on a primary side of a conversion unit.

Description of Related Art

The statements in this section merely provide background information related to the present disclosure and do not necessarily constitute prior art.

In the technical field of power converters, the over temperature protection (OTP) mechanism of the internal controller of the power converter has always been indispensable. However, no matter whether the input voltage of the power converter is low or high, the power converter must reach a fixed temperature or higher to activate (trigger) the over temperature protection. Therefore, when the input voltage of the power converter changes, the actual triggering point of the over temperature protection mechanism will be different. This will cause the controller to delay activating the over temperature protection mechanism, thereby increasing the risk of damaging the power converter.

Specifically, since the conversion efficiency of the power converter is different when the input voltage is low or high, or when the power converter is overloaded, the trigger point of the over temperature protection will actually be different due to different input voltages or output currents. Generally, the input voltage of the power converter is high, and the conversion efficiency is good so that the heat loss caused by the energy conversion is small. On the contrary, when the input voltage of the power converter is low, the conversion efficiency is poor, which causes more heat loss caused by energy conversion. Therefore, under the difference of the above conditions, the power converter will cause the actual trigger point of the over temperature protection mechanism to be different.

In the safety regulations after IEC62368, the maximum surface temperature of the controller's plastic case must not exceed 87° C. to limit abnormal conditions occur in the power converter. Therefore, in the above regulation and the input voltage of the power converter is high, or the output current is overloaded, it is easy to cause the power converter to actually be overloaded, but the over temperature protection mechanism has not been activated. In order to avoid this, it may be necessary to design the trigger point of the over temperature protection mechanism at the trigger point where the input voltage of the power converter is low.

However, if the design is below this trigger point and the input voltage of the power converter is high, there is a large error from the trigger point of the actual over temperature protection mechanism, which makes the over temperature protection mechanism meaningless.

Therefore, how to design a power converter with over temperature protection compensation, which is set on the primary side of the conversion unit and compensates for the over temperature protection point according to the input voltage of different voltage values or the output current of different loads to dynamically adjust the over temperature protection point is an important subject for inventors of the present disclosure.

SUMMARY

In order to solve the above-mentioned problems, a power converter with over temperature protection compensation is provided. The power converter with over temperature protection compensation includes a main conversion unit, a primary-side control unit, a primary detection circuit, and an over temperature adjustment circuit. The main conversion unit has primary side, the primary side is coupled to a primary rectifier filter circuit. The primary-side control unit is coupled to the primary side. The primary detection circuit is coupled to the primary-side control unit. The over temperature adjustment circuit is coupled to the primary-side control unit. The primary-side control unit obtains a primary voltage change value through the primary detection circuit, and the primary-side control unit correspondingly provides a current change value to the over temperature adjustment circuit according to the primary voltage change value; the over temperature adjustment circuit provides a temperature control voltage according to the current change value so that the primary-side control unit determines whether an over temperature protection is activated according to the temperature control voltage.

In one embodiment, the primary rectifier filter circuit includes a primary rectifier circuit and a primary filter circuit. The primary rectifier circuit receives an input voltage. The primary filter circuit is coupled to the primary rectifier circuit and the primary side. The primary rectifier circuit rectifies the input voltage into a rectified voltage, and the primary filter circuit filters the rectified voltage into a DC voltage.

In one embodiment, the primary detection circuit is coupled to the primary filter circuit, and the primary detection circuit provides the primary voltage change value according to the DC voltage, or the primary detection circuit is coupled to the primary rectifier circuit, and the primary detection circuit provides the primary voltage change value according to the input voltage.

In one embodiment, the over temperature adjustment circuit includes a temperature control resistor, the temperature control resistor generates a temperature control resistance according to an ambient temperature, and the current change value flows through the temperature control resistance to generate the temperature control voltage.

In one embodiment, the primary-side control unit includes a comparison unit; when the comparison unit determines that the temperature control voltage is less than a reference voltage, the primary-side control unit turns off the main conversion unit to activate the over temperature protection.

In one embodiment, the input voltage is higher, the current change value provided by the primary-side control unit is higher, and the input voltage is lower, the current change value provided by the primary-side control unit is lower.

In one embodiment, the power converter further includes an auxiliary winding. The auxiliary winding is coupled to the primary detection circuit and the main conversion unit. The auxiliary winding obtains an auxiliary voltage through the main conversion unit, and the primary detection circuit provides the primary voltage change value according to the auxiliary voltage.

In one embodiment, the primary detection circuit includes a resistor and a voltage division component. The resistor is coupled to the primary rectifier filter circuit or the main conversion unit. The voltage division component is coupled to the resistor. The voltage division component is a voltage division resistor or a capacitor, and a node between the resistor and the voltage division component is coupled to the primary-side control unit; the resistor receives a detection voltage corresponding to the input voltage, and provide the primary voltage change value through the node according to the detection voltage.

In one embodiment, the primary detection circuit further includes a diode. The diode is coupled to the resistor. The diode limits a polarity of the detection voltage.

In one embodiment, the primary detection circuit is coupled to the main conversion unit, and provides the primary voltage change value according to a primary-side current of the main conversion unit.

In one embodiment, the primary detection circuit includes a detection resistor. The detection resistor is coupled to a power switch of the main conversion unit and the primary-side control unit. The primary-side current flows through the detection resistor to generate the primary voltage change value.

In order to solve the above-mentioned problems, a power converter with over temperature protection compensation is provided. The power converter with over temperature protection compensation includes a main conversion unit, a primary-side control unit, a primary detection circuit, and an over temperature adjustment circuit. The main conversion unit has a primary side, the primary side is coupled to a primary rectifier filter circuit. The primary-side control unit is coupled to the primary side. The primary detection circuit is coupled to the primary-side control unit. The over temperature adjustment circuit is coupled to the primary-side control unit. The primary-side control unit obtains a primary voltage change value corresponding to an input voltage through the primary detection circuit, and the primary-side control unit provides a current fixed value to the over temperature adjustment circuit according to the primary voltage change value; the over temperature adjustment circuit correspondingly provides a resistance change value according to the change of the input voltage, and provides a temperature control voltage according to the current fixed value and the resistance change value so that the primary-side control unit determines whether an over temperature protection is activated according to the temperature control voltage.

In one embodiment, the over temperature adjustment circuit includes a temperature compensation circuit and a temperature control resistor. The temperature compensation circuit is coupled to the primary-side control unit. The temperature control resistor is coupled to the temperature compensation circuit. The temperature compensation circuit correspondingly generates the resistance change value according to the change of the input voltage, and the temperature control resistor generates a temperature control resistance according to an ambient temperature; the current fixed value flows through the resistance change value and the temperature control resistance to generate the temperature control voltage.

In one embodiment, the input voltage is higher, the resistance change value provided by the temperature compensation circuit is higher, and the input voltage is lower, the resistance change value provided by the temperature compensation circuit is lower.

In one embodiment, the temperature compensation circuit includes a detection circuit, a voltage control switch, a control unit, and a compensation resistor. The detection circuit is coupled to the primary rectifier filter circuit or the main conversion unit. The voltage control switch is coupled to the detection circuit. The control unit is coupled to the voltage control switch. The compensation resistor is coupled to the control unit. The detection circuit receives a detection voltage corresponding to the input voltage, and provides a voltage change value according to the detection voltage; the voltage control switch provides a control signal according to the voltage change value, and the control unit adjusts the resistance change value of the compensation resistor according to the control signal.

In one embodiment, the compensation resistor includes a first compensation resistor and a second compensation resistor. The first compensation resistor is coupled to the primary-side control unit, the temperature control resistor, and the control unit. The second compensation resistor is coupled to the primary-side control unit, the temperature control resistor, and the control unit. The control unit controls the first compensation resistor in parallel or not in parallel with the second compensation resistor according to the control signal so as to adjust the resistance change value.

In one embodiment, the temperature compensation circuit further includes a diode. The diode is coupled to the detection circuit. The diode limits a polarity of the detection voltage.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawings as follows.

DETAILED DESCRIPTION

Figure 1:
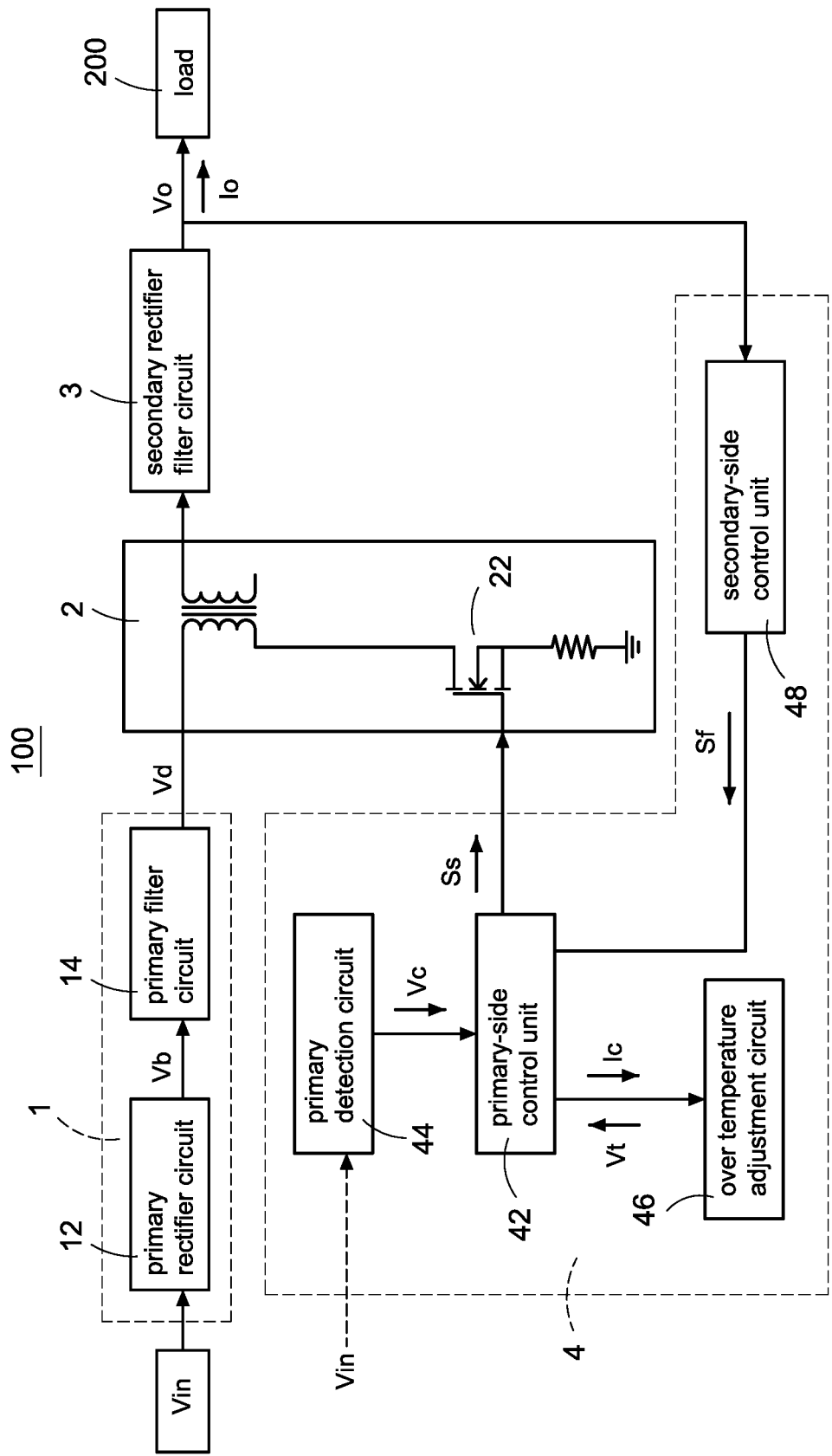
FIG. 1 is a block circuit diagram of a power converter with over temperature protection compensation according to a first embodiment of the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a block circuit diagram of a power converter with over temperature protection compensation according to a first embodiment of the present disclosure. The power converter 100 receives an input voltage Vin and converters the input voltage Vin into an output voltage Vo for supplying power to a load 200. The power converter 100 is a power converter 100 that accepts a wide input voltage Vin with an acceptable input voltage Vin ranging from 90 volts to 264 volts. The power converter 100 includes a primary rectifier filter circuit 1, a main conversion unit 2, a secondary rectifier filter circuit 3, and a control module 4. A primary side of the main conversion unit 2 is coupled to the primary rectifier filter circuit 1, and a secondary side of the main conversion unit 2 is coupled to the secondary rectifier filter circuit 3. The control module 4 controls the main conversion unit 2 to convert the input voltage Vin into the output voltage Vo through a path composed of the primary rectifier filter circuit 1, the main conversion unit 2, and the secondary rectifier filter circuit 3, and the secondary rectifier filter circuit 3 provides the output voltage Vo and an output current Io to the load 200. The primary rectifier filter circuit 1 includes a primary rectifier circuit 12 and a primary filter circuit 14, and the primary filter circuit 14 is coupled to the primary rectifier circuit 12 and the primary side of the main conversion unit 2. The primary rectifier circuit 12 rectifies the input voltage Vin into a rectified voltage Vb, and the primary filter circuit 14 filters the rectified voltage Vb into a DC voltage Vd.

The control module 4 includes a primary-side control unit 42, a primary detection circuit 44, an over temperature adjustment circuit 46, and a secondary-side control unit 48. The primary-side control unit 42 is coupled to a power switch 22 of the main conversion unit 2 for providing a switching signal Ss to control the main conversion unit 2 to convert the DC voltage Vd into the output voltage Vo. The secondary-side control unit 48 is coupled to the secondary rectifier filter circuit 3 to provide a feedback signal Sf to the primary-side control unit 42 according to the output voltage Vo so that the primary-side control unit 42 adjusts a duty cycle of the switching signal Ss according to the feedback signal Sf, thereby stabilizing a voltage value of the output voltage Vo. A coupling unit (not shown, for example but not limited to a photo coupler) may be used between the secondary-side control unit 48 and the primary-side control unit 42 so that the signal transmission between the primary-side control unit 42 and the secondary-side control unit 48 is electrically isolated. The primary detection circuit 44 is coupled to the primary-side control unit 42, and the primary-side control unit 42 obtains a primary voltage change value Vc corresponding to the change of the input voltage Vin through the primary detection circuit 44. Since different detection manners can be used, the input voltage Vin is indicated by dotted lines. The over temperature adjustment circuit 46 is coupled to the primary-side control unit 42, and the primary-side control unit 42 correspondingly provides a current change value Ic to the over temperature adjustment circuit 46 according to the primary voltage change value Vc. The over temperature adjustment circuit 46 provides a temperature control voltage Vt to the primary-side control unit 42 according to the current change value Ic so that the primary-side control unit 42 can determine whether an over temperature protection is activated according to the temperature control voltage Vt.

Specifically, the magnitude of the current change value Ic provided by the primary-side control unit 42 is changed with the change of the primary voltage change value Vc, and the power converter 100 has two parameters (indicated by dotted lines) that can affect the primary voltage change value Vc. The first is: the magnitude of the primary voltage change value Vc is changed with the change of the input voltage Vin. When the input voltage Vin is higher, the current change value Ic provided by the primary-side control unit 42 is higher, and when the input voltage Vin is lower, the current change value Ic provided by the primary-side control unit 42 is lower. The second is: the magnitude of the primary voltage change value Vc is changed with the change of the output current Io, i.e., as the load 200 is light, heavy, or overloaded. When the output current Io is higher, the primary voltage change value Vc provided by the primary detection circuit 44 is higher so that the current change value Ic provided by the primary-side control unit 42 is higher. When the output current Io is lower, the primary voltage change value Vc provided by the primary detection circuit 44 is lower so that the current change value Ic provided by the primary-side control unit 42 is lower. In one embodiment, the above examples of the output current Io may be reversed. That is, when the output current Io is higher, the primary voltage change value Vc provided by the primary detection circuit 44 is higher so that the current change value Ic provided by the primary-side control unit 42 is lower, and the rest may be deduced by analogy and the detail description is omitted here for conciseness.

The over temperature adjustment circuit 46 provides the temperature control voltage Vt to the primary-side control unit 42 according to the current change value Ic and an ambient temperature where the over temperature adjustment circuit 46 is located. Therefore, the over temperature protection point at which the primary-side control unit 42 activates the over temperature protection changes with the input voltage Vin, or the over temperature protection point at which the primary-side control unit 42 activates the over temperature protection changes with the output current Io. Therefore, through the above-mentioned compensation manner, the power converter 100 can avoid the over temperature protection from being triggered normally due to the difference in efficiency under the conditions of different input voltages Vin or different output currents Io, thereby avoiding the risk of delaying the over temperature protection.

Further, the power converter 100 with over temperature protection compensation according to the present disclosure compensates for the over temperature protection point of the over temperature protection according to the input voltage Vin or the output current Io, and therefore all detection manners can be applied in the present disclosure. In one embodiment of the present disclosure, at least four detection manners are included to determine the voltage level of the input voltage Vin, which will be further described later.

Figure 2A:
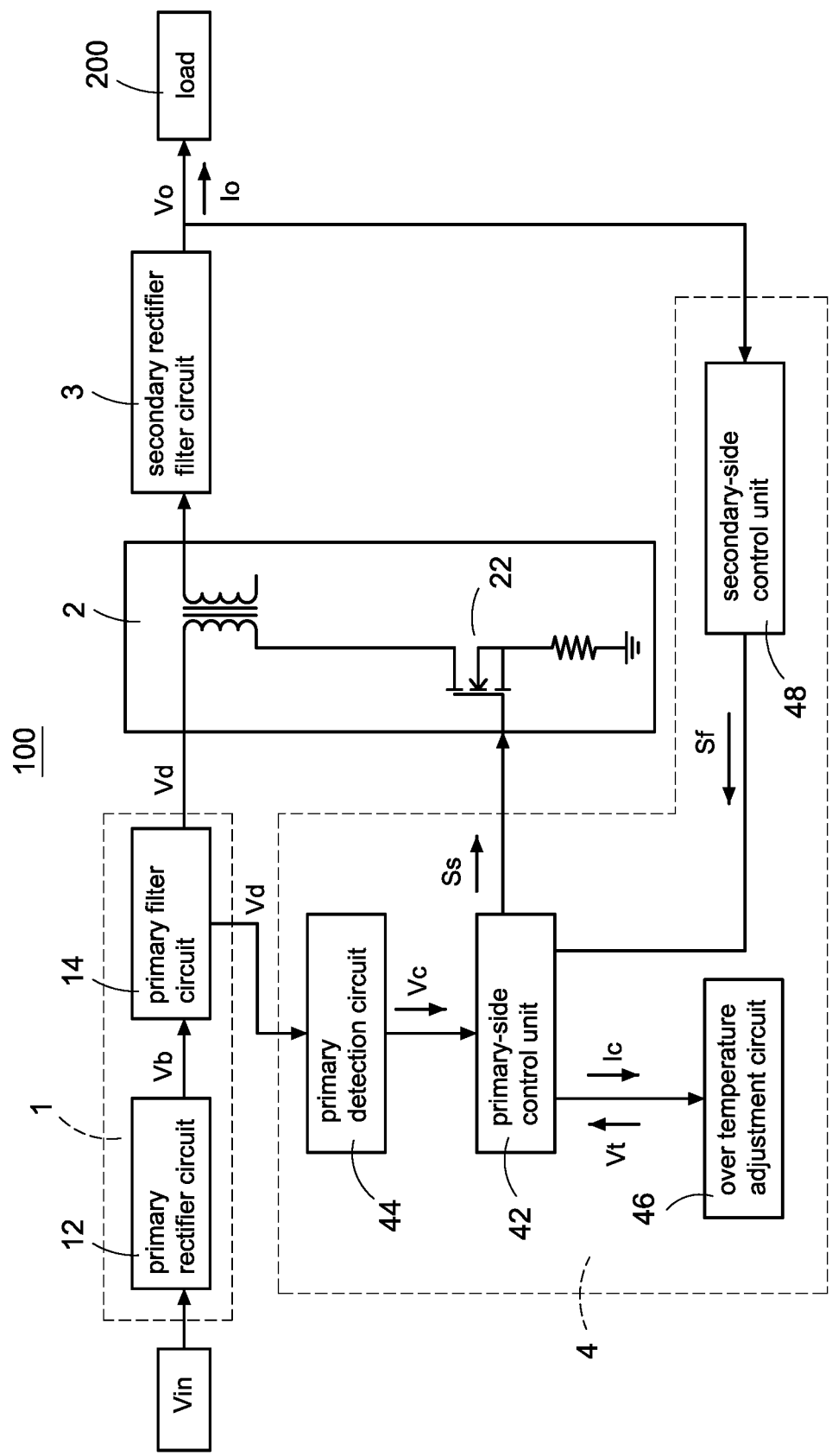
FIG. 2A is a block circuit diagram of a first detection manner of a primary detection circuit according to the present disclosure.
Figure 2B:
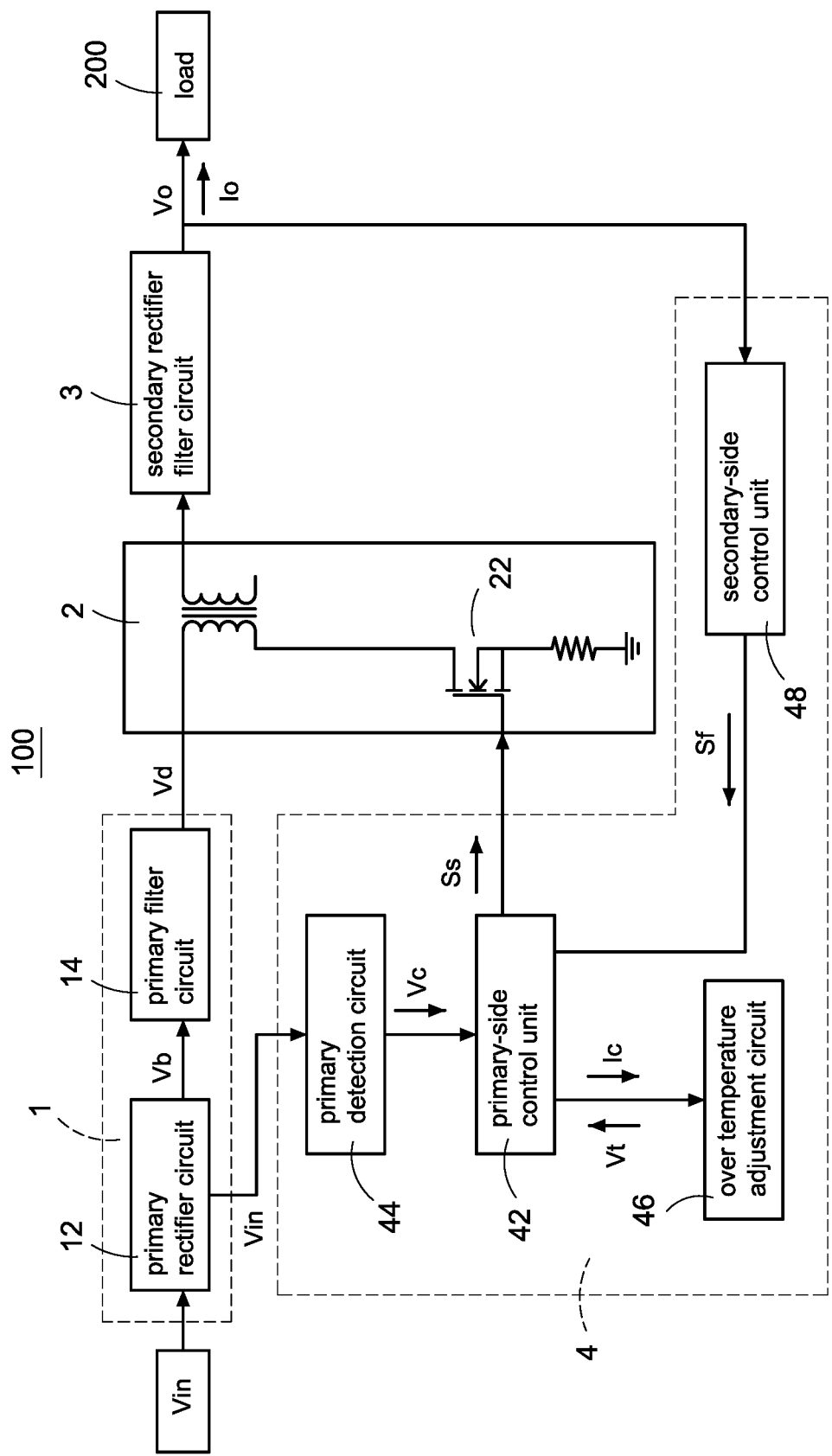
FIG. 2B is a block circuit diagram of a second detection manner of the primary detection circuit according to the present disclosure.
Figure 2C:
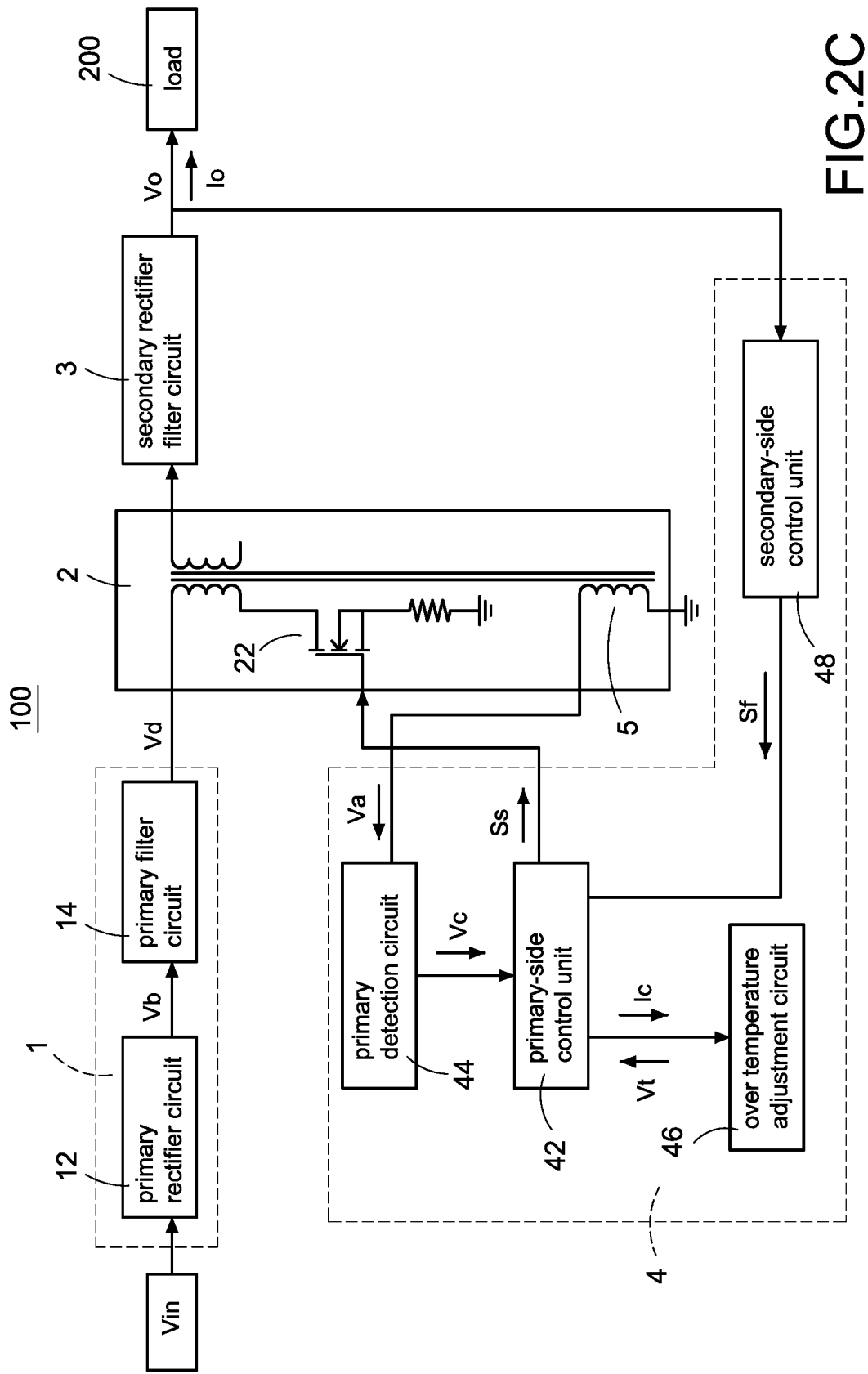
FIG. 2C is a block circuit diagram of a third detection manner of the primary detection circuit according to the present disclosure.
Figure 2D:
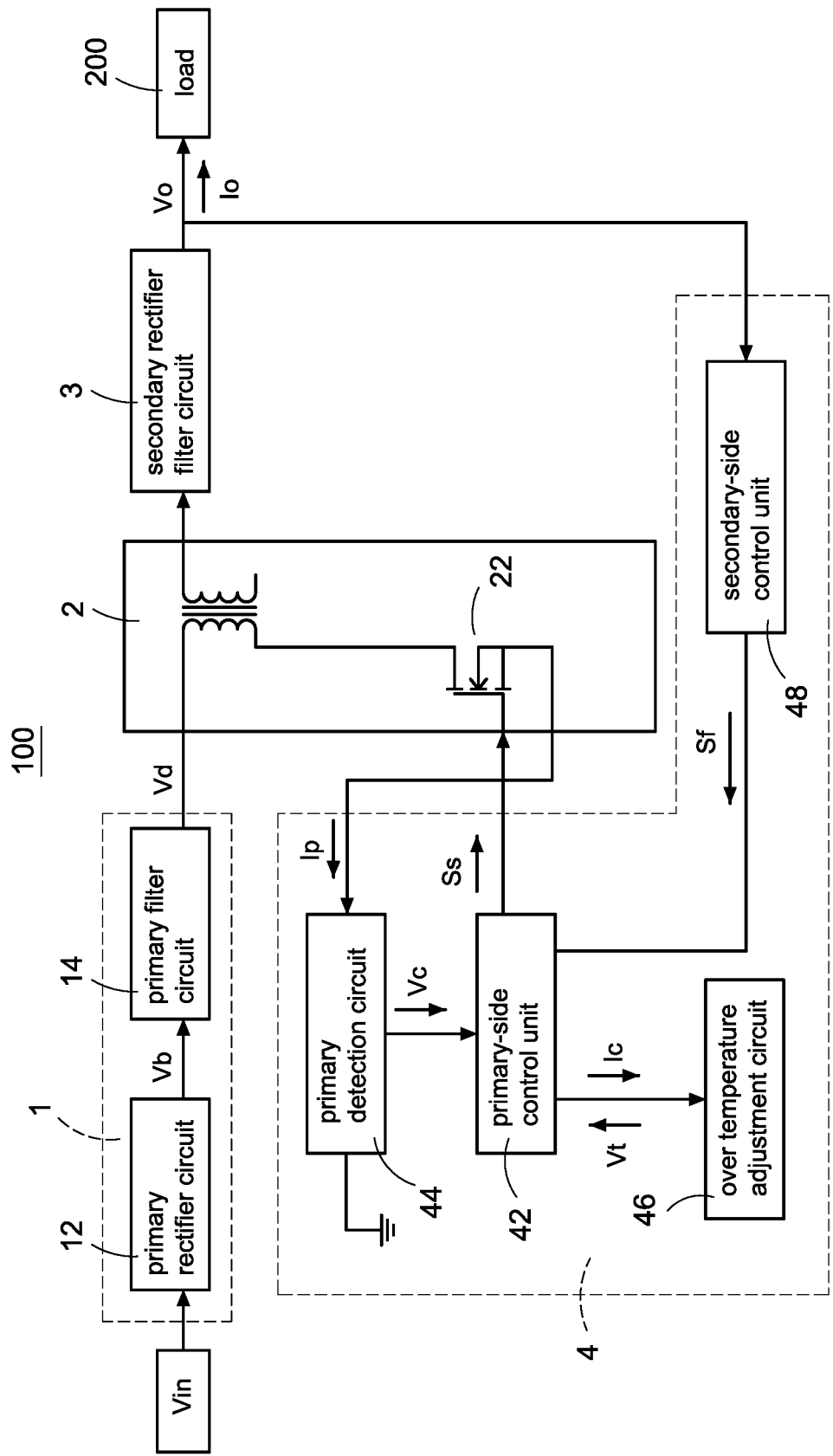
FIG. 2D is a block circuit diagram of a fourth detection manner of the primary detection circuit according to the present disclosure.

Please refer to FIG. 2A, which shows a block circuit diagram of a first detection manner of a primary detection circuit according to the present disclosure, please refer to FIG. 2B, which shows a block circuit diagram of a second detection manner of the primary detection circuit according to the present disclosure, please refer to FIG. 2C, which shows a block circuit diagram of a third detection manner of the primary detection circuit according to the present disclosure, and please refer to FIG. 2D, which shows a block circuit diagram of a fourth detection manner of the primary detection circuit according to the present disclosure, and also refer to FIG. 1. As shown in FIG. 2A, the primary detection circuit 44 is coupled to the primary filter circuit 14, and the primary detection circuit 44 provides the primary voltage change value Vc according to the DC voltage Vd. When the input voltage Vin changes, the voltage value of the DC voltage Vd stored in the primary filter circuit 14 changes with the input voltage Vin. Therefore, the change of the input voltage Vin can be known by detecting the DC voltage Vdc on the primary filter circuit 14. As shown in FIG. 2B, the primary detection circuit 44 is coupled to the primary rectifier circuit 12, and the primary detection circuit 44 provides the primary voltage change value Vc according to the input voltage Vin. When the input voltage Vin changes, the primary detection circuit 44 can accurately know the change of the input voltage Vin by directly detecting the input voltage Vin, thereby providing more accurate primary voltage change value Vc.

As shown in FIG. 2C, the power converter 100 further includes an auxiliary winding 5. The auxiliary winding 5 is coupled to a transformer of the main conversion unit 2, and obtains an auxiliary voltage Va by means of electromagnetic coupling. The primary detection circuit 44 is coupled to the auxiliary winding 5 and provides the primary voltage change value Vc through the auxiliary voltage Va. When the input voltage Vin changes, the voltage value of the auxiliary voltage Va obtained from the auxiliary winding 5 changes with the input voltage Vin. Therefore, the change of the input voltage Vin can be known by detecting the auxiliary voltage Va on the auxiliary winding 5. Moreover, when the output current Io changes, the duty cycle of the auxiliary voltage Va obtained from the auxiliary winding 5 changes with the output current Io. Therefore, the change of the output current Io can be known by detecting the auxiliary voltage Va on the auxiliary winding 5. As shown in FIG. 2D, the primary detection circuit 44 is coupled to a path from the power switch 22 of the main conversion unit 2 to the ground point, and the primary detection circuit 44 provides the primary voltage change value Vc according to a primary-side current Ip flowing from the power switch 22 to the ground point. When the input voltage Vin changes, the change of the primary-side current Ip is inversely proportional to the change of the input voltage Vin. Therefore, the change of the input voltage Vin can be known by detecting the primary-side current Ip flowing through the primary detection circuit 44. In addition, when the output current Io changes, the primary-side current Ip changes with the output current Io. Therefore, the change of the output current Io can be known by detecting the change of the primary-side current Ip. The above-mentioned detection manners in FIG. 2C to FIG. 2D can be applied to simultaneously detect the input voltage Vin or the output current Io, and therefore the primary-side control unit 42 should be determined which as the source according to the actual circuit conditions.

Since the primary detection circuit 44 includes at least the detection manners of FIG. 2A to FIG. 2D described above, its internal circuits must be different according to the detection manners described above. Please refer to FIG. 3A, which shows a circuit diagram of the primary detection circuit according to a first embodiment of the present disclosure, and please refer to FIG. 3B, which shows a circuit diagram of the primary detection circuit according to a second embodiment of the present disclosure. As shown in FIG. 3A, the primary detection circuit 44 includes a resistor 442 and a voltage division component 444. The resistor 442 is coupled to the primary rectifier filter circuit 1 or the main conversion unit 2 (as shown in FIG. 2A to FIG. 2C), and the voltage division component 444 is coupled to the resistor 442. Anode A between the resistor 442 and the voltage division component 444 is coupled to the primary-side control unit 42, and the resistor 442 receives the detection voltage Vs corresponding to the input voltage Vin. As shown in FIG. 2A to FIG. 2C, the voltage value of the detection voltage Vs means the input voltage Vin, the DC voltage Vdc, or the auxiliary voltage Va, and the duty cycle of the voltage of the auxiliary voltage Va responds to the change of the output current Io. The voltage value of the detection voltage Vs is divided by the resistor 442 and the voltage division component 444, and the primary voltage change value Vc at the node A is provided to the primary-side control unit 42. In particular, the voltage division component 444 may be a voltage division resistor or a capacitor. If the voltage division component 444 is the voltage division resistor, the component cost is cheaper and the dynamic response is better. If the voltage division component 444 is the capacitor, it has the function of energy storage. Therefore, compared with the voltage division resistor, the value of the primary voltage change value Vc is more stable but the dynamic response is poor. The application of FIG. 3A is applicable to the embodiments of FIG. 2A to FIG. 2C.

The primary detection circuit 44 further includes a diode D (indicated by dotted lines), and the diode D is coupled to the resistor 442. The diode D is used to limit a polarity of the detection voltage Vs to avoid the primary voltage change value Vc from generating a voltage with wrong polarity. Specifically, the input voltage Vin and the auxiliary voltage Va may have a negative voltage. If the input voltage Vin or the auxiliary voltage Va is the negative, the primary voltage change value Vc will be negative so that the primary-side control unit 42 may be damaged due to failure to accept the negative voltage. However, if the primary-side control unit 42 itself has a function of limiting the polarity of the primary voltage change value Vc, this is not in this limit. Therefore, it is necessary to use the diode D to limit the polarity of the detection voltage Vs to avoid the above condition. In particular, the application of the diode D is particularly suitable for the embodiments shown in FIG. 2B and FIG. 2C.

Figure 3B:
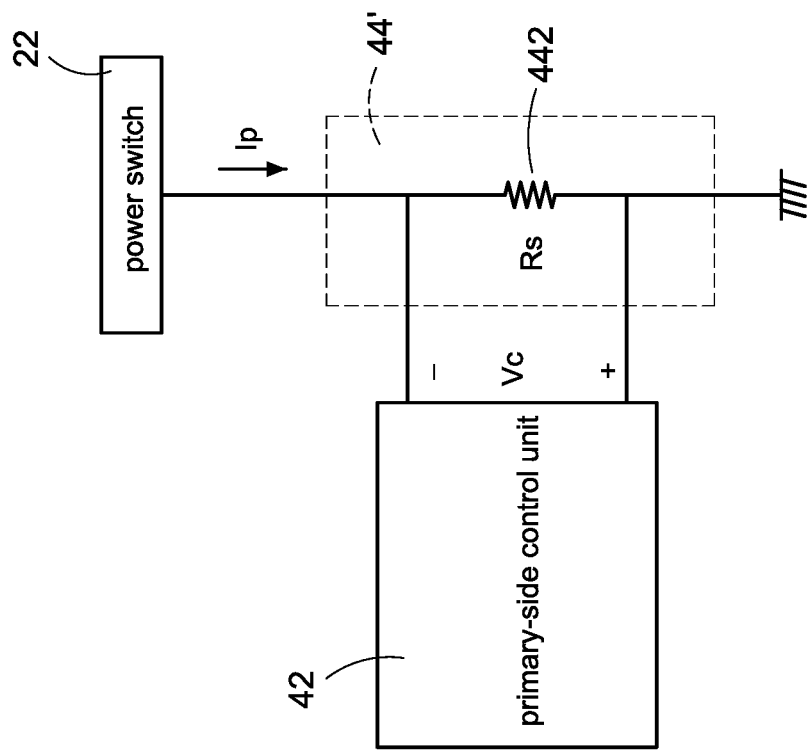
FIG. 3B is a circuit diagram of the primary detection circuit according to a second embodiment of the present disclosure.
Figure 3A:
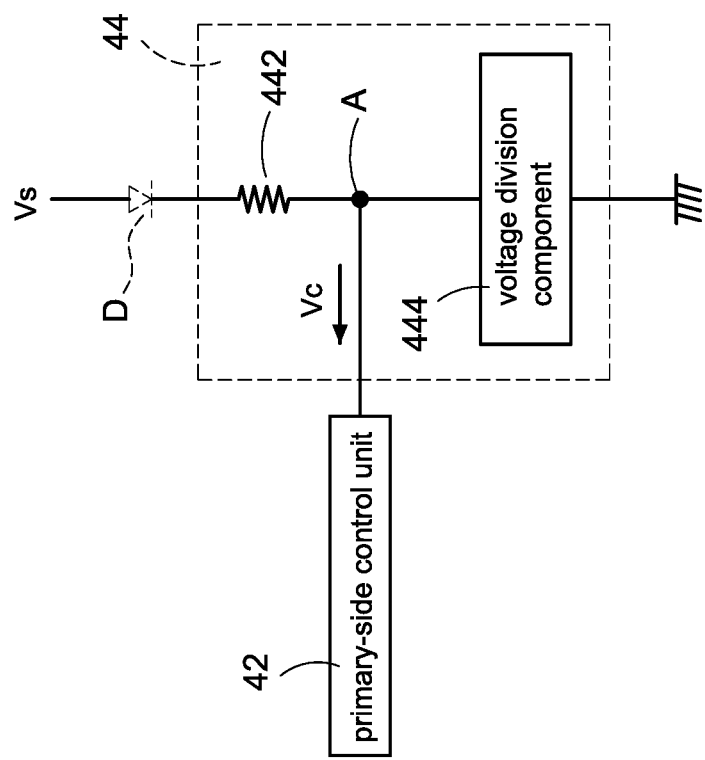
FIG. 3A is a circuit diagram of the primary detection circuit according to a first embodiment of the present disclosure.

As shown in FIG. 3B, the primary detection circuit 44' includes a detection resistor Rs. One end of the detection resistor Rs is coupled to the power switch 22 and the other end of the detection resistor Rs is coupled to the ground point, and the two ends of the detection resistor Rs are respectively two different ends of the primary-side control unit 42. Since the change of the primary-side current Ip is proportional to the change of the input voltage Vin, the voltage drop (i.e., the primary voltage change value Vc) across the detection resistor Rs changes when the primary-side current Ip flows through the detection resistor Rs. Also, the duty cycle of the primary-side current Ip is response to the change of the output current Io. Therefore, the primary-side control unit 42 can know the change of the input voltage Vin or the change of the output current Io by detecting the voltage drop across the detection resistor Rs. In particular, the application of the detection resistor Rs is particularly suitable for the embodiment shown in FIG. 2D.

Figure 4:
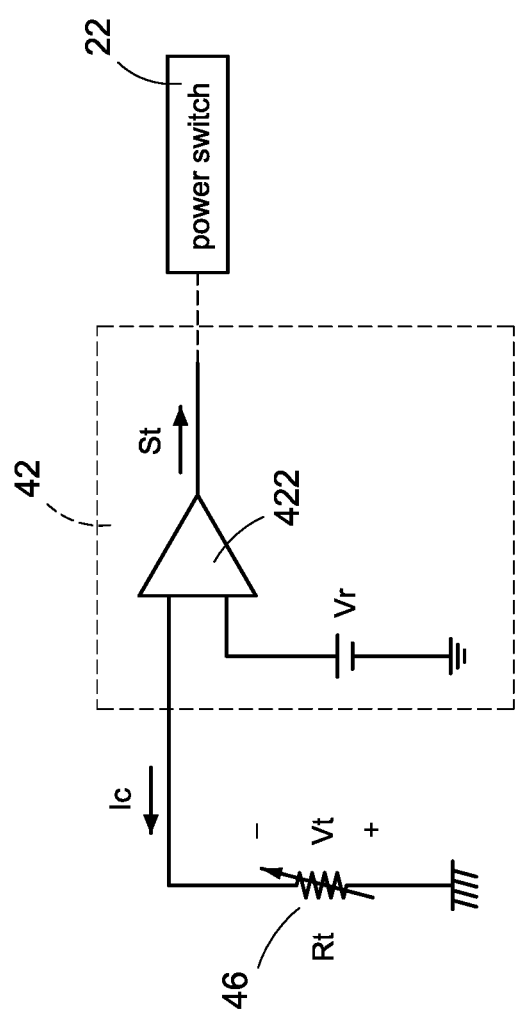
FIG. 4 is a circuit diagram of temperature comparison of an over temperature adjustment circuit and a primary-side control unit according to the present disclosure.

Please refer to FIG. 4, which shows a circuit diagram of temperature comparison of an over temperature adjustment circuit and a primary-side control unit according to the present disclosure, and also refer to FIG. 1 to FIG. 3B. The over temperature adjustment circuit 46 includes a temperature control resistor Rt (for example but not limited to a resistor with negative temperature coefficient), and the temperature control resistor Rt generates a temperature control resistance according to the ambient temperature of the location. When the ambient temperature is higher, the temperature control resistance is smaller, and when the ambient temperature is lower, the temperature control resistance is larger. When the current change value Ic flows through the temperature control resistor Rt, a voltage drop occurs across the temperature control resistor Rt, and the voltage drop is defined as a temperature control voltage Vt. The primary-side control unit 42 includes a comparison unit 422, and one input end of the comparison unit 422 receives the temperature control voltage Vt and the other input end of the comparison unit 422 receives a reference voltage Vr. The comparison unit 422 compares the temperature control voltage Vt with the reference voltage Vr to determine whether an over temperature signal St is provided from the comparison unit 422. When the over temperature signal St is outputted from the comparison unit 422 of the primary-side control unit 42 to turn off the power switch 22 so that the main conversion unit 2 is turned off to activate the over temperature protection.

Specifically, since the current change value Ic changes with the input voltage Vin or the output current Io, and the temperature control resistance changes with the ambient temperature, the temperature control voltage Vt will change with the input voltage Vin and the ambient temperature at the same time. Afterward, the primary-side control unit 42 knows whether the over temperature protection is activated by comparing the temperature control voltage Vt with the reference voltage Vr having a fixed voltage value. In particular, the voltage value of the reference voltage Vr is the over temperature protection point. Please refer to FIG. 1 to FIG. 4, when the input voltage Vin is higher (for example but not limited to 264 volts), the voltage value of the primary voltage change value Vc obtained by the detection manners shown in FIG. 2A to FIG. 2C is higher so that the primary-side control unit 42 generates the current change value Ic having a higher current value according to the primary voltage change value Vc having a higher voltage value. When the input voltage Vin is lower (for example but not limited to 90 volts), the voltage value of the primary voltage change value Vc obtained by the detection manners shown in FIG. 2A to FIG. 2C is lower so that the primary-side control unit 42 generates the current change value Ic having a lower current value according to the primary voltage change value Vc having a lower voltage value.

When the ambient temperature is fixed (i.e., the temperature control resistance is fixed) and the input voltage Vin is 264 volts, the temperature control voltage Vt obtained by the primary-side control unit 42 is higher than that when the input voltage Vin is 90 volts so that the voltage value of the temperature control voltage Vt when the input voltage Vin is 264 volts is father from the over temperature protection point (i.e., the reference voltage Vr) than when the input voltage Vin is 90 volts. Therefore, if the ambient temperature changes, when the input voltage Vin is 264 volts, the higher ambient temperature (relative to the input voltage Vin of 90 volts) is required to trigger over temperature protection. When the input voltage Vin is 90 volts, it is the opposite of the case when the input voltage is 264 volts, and will not be repeated here. In addition, the current change value Ic provided by the primary-side control unit 42 may be a value that linearly changes according to the linear change of the input voltage Vin (i.e., the curve of the current change value Ic is proportional to the curve of the linear change of the input voltage Vin), or the current change value Ic may be a value that changes in stages according to the linear change of the input voltage Vin (for example but not limited to the changed points are 90 volts, 170 volts, or 264 volts), that can be adjusted according to the resolution set by the primary-side control unit 42.

When the same example as described above is applied to the embodiment of FIG. 3B, since the change of the primary-side current Ip is proportional to the change of the input voltage Vin, the primary-side current Ip is higher when the input voltage Vin is higher. Since a higher primary-side current Ip results in a higher primary-voltage change value Vc (i.e., the voltage drop across the detection resistor Rs is higher), when applied to the embodiment of FIG. 3B, the primary-side control unit 42 provides a higher current value Ic (relative to the input voltage Vin of 90 volts) according to the higher primary voltage change value Vc. Conversely, a lower current change value Ic is provided. The subsequent protection control is the same as the above-mentioned embodiments, and will not be repeated here. In addition, when the same example as described above is applied to the embodiment for detecting the current level of the output current Io, the change of the current change value Ic is proportional to the current level of the output current Io, which is similar to the difference between the above-mentioned input voltage Vin, and will not be described again here.

Take the circuit of FIG. 4 and the circuit of FIG. 3 as an exemplified demonstration for the detection of the input voltage Vin. It is assumed that the primary-side control unit 42 activates the over temperature protection and the over temperature protection point is 0.5 volts (i.e., the reference voltage Vr is 0.5 volts) when a temperature of a case of the power converter 100 is 90° C. Under this condition, it is assumed that the temperature control resistance of the temperature control resistor Rt is 1 ohm when the input voltage Vin is 90 volts, and the temperature control resistance of the temperature control resistor Rt is 2 ohms when the input voltage Vin is 264 volts. When the input voltage Vin is 90 volts, the primary-side control unit 42 knows that the input voltage Vin is 90 volts according to the primary voltage change value Vc and provides the current change value Ic with 500 mA to the temperature control resistor Rt. At this condition, when the temperature of the case of the power converter 100 reaches 90° C., the temperature control voltage Vt is 0.5 volts generated from the temperature control resistor Rt (1 ohm) and the current change value Ic (500 mA), i.e., 0.5 volts=1 ohm*500 mA. Therefore, the primary-side control unit 42 provides the over temperature protection. When the input voltage Vin is 264 volts, the primary-side control unit 42 knows that the input voltage Vin is 264 volts according to the primary voltage change value Vc and provides the current change value Ic with 250 mA to the temperature control resistor Rt. At this condition, when the temperature of the case of the power converter 100 reaches 90° C., the temperature control voltage Vt is 0.5 volts generated from the temperature control resistor Rt (2 ohms) and the current change value Ic (250 mA), i.e., 0.5 volts=2 ohms*500 mA. Therefore, the primary-side control unit 42 provides the over temperature protection.

When the output current Io is overloaded (known by the duty cycle), the primary-side control unit 42 knows that the output current Io is overloaded according to the primary voltage change value Vc. At this condition, a delay time is internally set by the primary-side control unit 42. When the output current Io is overloaded and the delay time is exceeded, the primary-side control unit 42 changes the current change value Ic to 200 mA. Under the overloaded condition, the resistance of the temperature control resistor Rt must be less than 2 ohms since the ambient temperature rises and the resistance of the temperature control resistor Rt becomes smaller. Therefore, the temperature control voltage Vt generated from the temperature control resistor Rt (<2 ohms, it is assumed to be 1.5 ohms) and the current change value Ic (200 mA) must be less than the over temperature protection point (i.e., 1.5 ohms*200 mA<0.5 volts). Therefore, the primary-side control unit 42 provides the over temperature protection.

Figure 5:
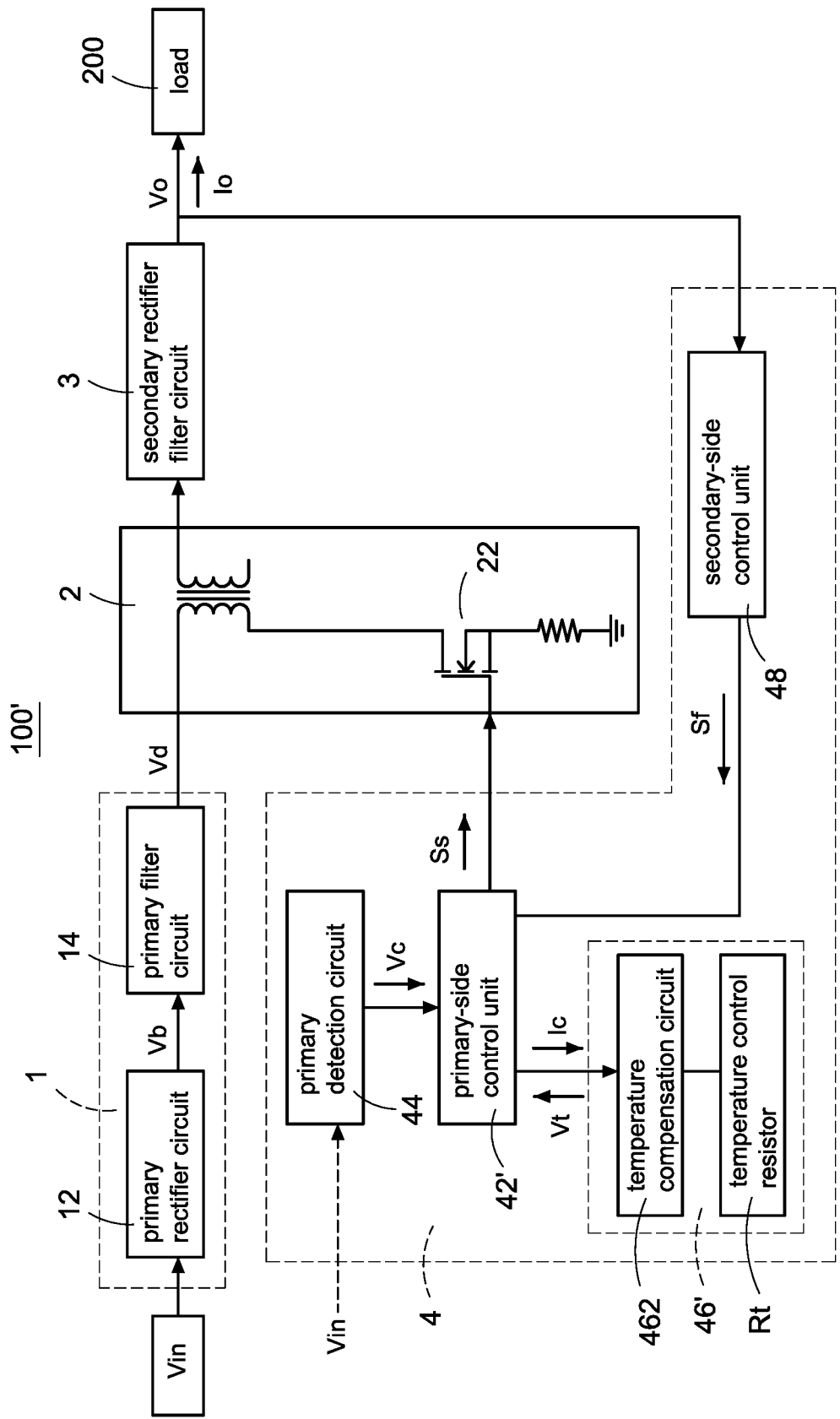
FIG. 5 is a block circuit diagram of the power converter with over temperature protection compensation according to a second embodiment of the present disclosure.

Please refer to FIG. 5, which shows a block circuit diagram of the power converter with over temperature protection compensation according to a second embodiment of the present disclosure, and also refer to FIG. 1 to FIG. 4. The difference between second embodiment and the first embodiment shown in FIG. 1 is that the primary-side control unit 42' generates a current fixed value If according to the primary voltage change value Vc and provides the current fixed value If to the over temperature adjustment circuit 46'. That is, the current fixed value If does not change with the change of the input voltage Vin. The over temperature adjustment circuit 46' has a resistance change value that generates a resistance change according to the input voltage Vin in addition to a temperature control resistance according to the ambient temperature of the location. The over temperature adjustment circuit 46' provides the temperature control voltage Vt to the primary-side control unit 42' according to the current fixed value If and the resistance change value so that the primary-side control unit 42' can determine whether the over temperature protection is activated according to the temperature control voltage Vt.

Specifically, the over temperature adjustment circuit 46' includes a temperature compensation circuit 462 and a temperature control resistor Rt, and the temperature compensation circuit 462 is coupled to the primary-side control unit 42' and the temperature control resistor Rt. The temperature control resistor Rt is the same as the embodiment in FIG. 4, and the temperature control resistor Rt generates a temperature control resistance according to an ambient temperature where the over temperature adjustment circuit 46' is located, and the temperature compensation circuit 462 correspondingly generates a resistance change value according to the change of the input voltage Vin. When the input voltage Vin is higher (for example but not limited to 264 volts), a higher resistance change value is provided by the temperature compensation circuit 462; when the input voltage Vin is lower (for example but not limited to 90 volts), a lower resistance change value is provided by the temperature compensation circuit 462. When the current fixed value If flows through the over temperature adjustment circuit 46', a first temperature control voltage is generated on the temperature compensation circuit 462 (that is, the first temperature control voltage is the product of the resistance change value and the current fixed value If), and a second temperature control voltage is generated across the temperature control resistor Rt. The first temperature control voltage plus the second temperature control voltage is the temperature control voltage Vt. Afterward, the primary-side control unit 42' determines whether an over temperature protection is activated according to the temperature control voltage Vt.

In one embodiment, the temperature compensation circuit 462 is not limited to the coupling manner as shown in FIG. 5, and may be coupled between the primary-side control unit 42' and the temperature control resistor Rt, or between the temperature control resistor Rt and the ground point. In one embodiment, the unexplained circuit structure and control manner of the power converter 100' according to the second embodiment of FIG. 5 are the same as those of FIG. 1. The detection manner applicable to the primary voltage change value Vc of FIG. 2A to FIG. 2D and the internal structure of the primary detection circuit 44 are also applicable to the circuit structures of FIG. 3A to FIG. 3B, and will not be described again here.

Figure 6:
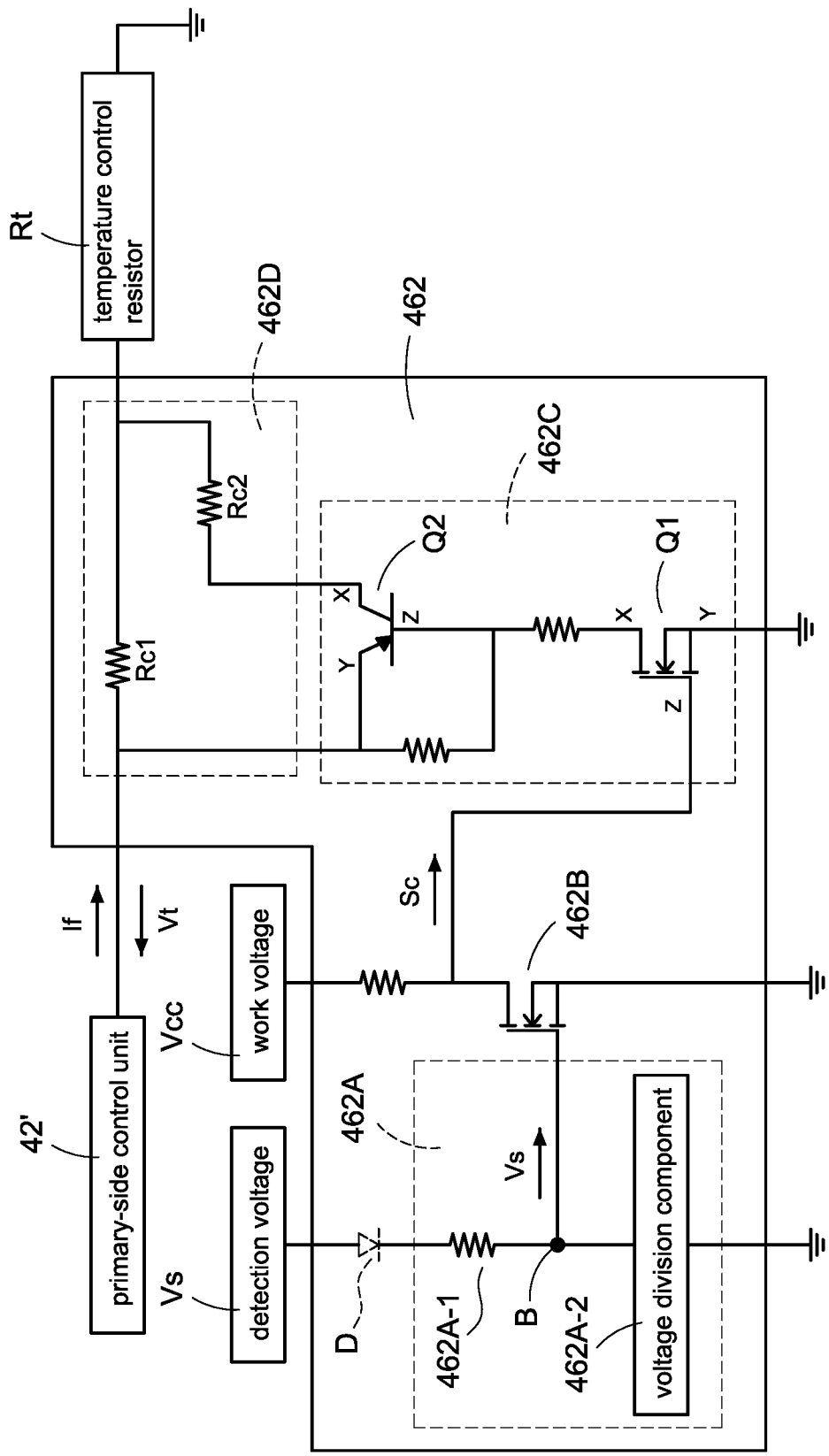
FIG. 6 is a block circuit diagram of a temperature compensation circuit according to the present disclosure.

Please refer to FIG. 6, which shows a block circuit diagram of a temperature compensation circuit according to the present disclosure, and also refer to FIG. 1 to FIG. 5. The temperature compensation circuit 462 includes a detection circuit 462A, a voltage control switch 462B, a control unit 462C, and a compensation resistor 462D. One end of the detection circuit 462A is coupled to the primary rectifier filter circuit 1 or the main conversion unit 2, and the other end of the detection circuit 462A is coupled to one end of the voltage control switch 462B. The other end of the voltage control switch 462B is coupled to a work voltage Vcc and one end of the control unit 462C, and the other end of the control unit 462C is coupled to the compensation resistor 462D, the primary-side control unit 42', and the temperature control resistor Rt. In particular, the coupling position of the primary-side control unit 42' and the temperature control resistor Rt can be exchanged with each other, and since the temperature compensation circuit 462 can be coupled between the temperature control resistor Rt and the ground point, two ends of the compensation resistor 462D can also be respectively coupled to the temperature control resistor Rt and the ground point.

Specifically, the circuit structure of the detection circuit 462A may be similar to that of FIG. 3A. A resistor 462A-1 is the same as the resistor 442, and a voltage division component 462A-2 is the same as the voltage division component 444. The resistor 462A-1 receives the detection voltage Vs corresponding to the input voltage Vin. As shown in FIG. 2A to FIG. 2C, the voltage value of the detection voltage Vs means the input voltage Vin, the DC voltage Vdc, or the auxiliary voltage Va, and the auxiliary voltage Va can be obtained from the auxiliary winding which is coupled to the primary-side winding or the secondary-side winding of the transformer of the main conversion unit 2. The voltage change value Vc1 is provided from a node B between the resistor 462A-1 and the voltage division component 462A-2 to the voltage control switch 462B. The difference between the work voltage Vcc and the voltage change value Vc1 causes the voltage control switch 462B to be turned on or turned off so as to provide a control signal Sc to the control unit 462C. In particular, the temperature compensation circuit 462 may also include a diode D (indicated by dotted lines) as shown in FIG. 3A, which is coupled to the resistor 462A-1 and has the same effect as FIG. 3A, and will not be described again here. In addition, the work voltage Vcc can be an externally supplied voltage (for example but not limited to a voltage provided by an additional power supply) or a voltage provided by the power converter itself (for example but not limited to a voltage provided an additional auxiliary winding coupled to the main conversion unit 2).

The control unit 462C includes a first switch Q1 and a second switch Q2, and a control end Z of the first switch Q1 is coupled to the voltage control switch 462B to receive the control signal Sc. An output end Y and a control end Z of the second switch Q2 are coupled to an input end X of the first switch Q1, and an input end X and the output end Y of the second switch Q2 are coupled to the compensation resistor 462D. The compensation resistor 462D includes a first compensation resistor Rc1 and a second compensation resistor Rc2, and one end of the first compensation resistor Rc1 is coupled to the output end Y of the second switch Q2. One end of the second compensation resistor Rc2 is coupled to the input end X of the second switch Q2, and the other end of the second compensation resistor Rc2 is coupled to the other end of the first compensation resistor Rc1. The control unit 462C controls the first compensation resistor Rc1 in parallel or not in parallel with the second compensation resistor Rc2 according to the control signal Sc so as to adjust the resistance change value of the compensation resistor 462D.

Furthermore, when the input voltage Vin is higher (for example but not limited to 264 volts), the voltage change value Vc1 with a higher voltage value is generated at the node B. The voltage change value Vc1 with the higher voltage value makes the voltage control switch 462B be turned on to provide the control signal Sc with the low level (i.e., the control signal Sc with the ground point voltage). The control signal Sc with the low level makes the first switch Q1 of the control unit 462C be turned off so as to turn off the second switch Q2. Since the second switch Q2 is turned off, the first compensation resistor Rc1 fails to in parallel with the second compensation resistor Rc2 so that the compensation resistor 462D provides the resistance change value of the resistance of the first compensation resistor Rc1. When the input voltage Vin is lower (for example but not limited to 90 volts), the voltage change value Vc1 with a low voltage value is generated at the node B. The voltage change value Vc1 with the lower voltage value makes the voltage control switch 462B be turned off to provide the control signal Sc with the high level (i.e., the control signal Sc with the work voltage Vcc). The control signal Sc with the high level makes the first switch Q1 of the control unit 462C be turned on so as to turn on the second switch Q2. Since the second switch Q2 is turned on, the first compensation resistor Rc1 is in parallel with the second compensation resistor Rc2 so that the compensation resistor 462D provides the resistance change value of the resistance of the first compensation resistor Rc1 in parallel with the second compensation resistor Rc2.

Also refer to FIG. 4 and FIG. 5, the circuit structure inside the primary-side control unit 42' is the same as that of FIG. 4. When the ambient temperature is fixed (i.e., the temperature control resistance is fixed) and the input voltage Vin is 264 volts, the resistance change value is larger than that when the input voltage Vin is 90 volts. Therefore, the produce of the fixed current value If and the temperature control resistor Rt and the resistance change value is larger so that the obtained temperature control voltage Vt is higher than that when the input voltage Vin is 90 volts. Accordingly, the voltage value of the temperature control voltage Vt when the input voltage Vin is 264 volts is farther from the temperature protection point (i.e., the reference voltage Vr) than that when the input voltage Vin is 90 volts. That is, if the ambient temperature changes, when the input voltage Vin is 264 volts, a higher ambient temperature (relative to the input voltage Vin of 90 volts) is required to trigger the over temperature protection. When the input voltage is 90 volts, it is the opposite of the case when the input voltage is 264 volts, and will not be described again here. The primary-side control unit 42' of the embodiment of FIG. 5 may use a conventional controller, which utilizes a temperature compensation circuit 462 that generates different resistance change values according to the voltage level of the input voltage Vin, thereby generating over temperature protection points can be changed with different input voltages Vin. Therefore, through the above-mentioned compensation manner, the over temperature protection cannot be triggered normally due to the efficiency difference under the conditions of different input voltage Vin, and the risk of delaying the over temperature protection can be avoided.

In summary, the main advantages and effects of the embodiments of the present disclosure are that the power converter with over temperature protection compensation of the present disclosure compensates over temperature protection points of the over temperature protection according to the voltage level of the input voltage and the current level of the output current. Therefore, the over temperature protection points of the over temperature protection activated by the primary-side control unit change with the voltage level of the input voltage or the current level of the output current. Accordingly, through the above-mentioned compensation manner, the over temperature protection cannot be triggered normally due to the difference in efficiency under the conditions of different input voltages or different output currents of the power converter, thereby avoiding the risk of delaying over temperature protection.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power converter with over temperature protection compensation, comprising:
    a main conversion unit having a primary side, the primary side coupled to a primary rectifier filter circuit,
    a primary-side control unit coupled to the primary side,
    a primary detection circuit coupled to the primary-side control unit, and
    an over temperature adjustment circuit coupled to the primary-side control unit,
    wherein the primary-side control unit is configured to obtain a primary voltage change value corresponding to the change in an input voltage through the primary detection circuit, and the primary-side control unit is correspondingly configured to provide a current change value to the over temperature adjustment circuit according to the primary voltage change value; the over temperature adjustment circuit is configured to provide a temperature control voltage according to the current change value so that the primary-side control unit is configured to determine whether an over temperature protection is activated according to the temperature control voltage, and
    wherein the input voltage received by the power converter is a wide input voltage; the input voltage is higher, the current change value provided by the primary-side control unit is higher, and the input voltage is lower, the current change value provided by the primary-side control unit is lower.

2. The power converter in claim 1, wherein the primary rectifier filter circuit comprises:
   a primary rectifier circuit configured to receive the input voltage, and
   a primary filter circuit coupled to the primary rectifier circuit and the primary side,
   wherein the primary rectifier circuit is configured to rectify the input voltage into a rectified voltage, and the primary filter circuit is configured to filter the rectified voltage into a DC voltage.

3. The power converter in claim 2, wherein the primary detection circuit is coupled to the primary filter circuit, and the primary detection circuit is configured to provide the primary voltage change value according to the DC voltage, or the primary detection circuit is coupled to the primary rectifier circuit, and the primary detection circuit is configured to provide the primary voltage change value according to the input voltage.

4. The power converter in claim 1, wherein the over temperature adjustment circuit comprises a temperature control resistor, the temperature control resistor is configured to generate a temperature control resistance according to an ambient temperature, and the current change value flows through the temperature control resistance to generate the temperature control voltage.

5. The power converter in claim 1, wherein the primary-side control unit comprises a comparison unit; when the comparison unit is configured to determine that the temperature control voltage is less than a reference voltage, the primary-side control unit is configured to turn off the main conversion unit to activate the over temperature protection.

6. The power converter in claim 1, further comprising:
   an auxiliary winding coupled to the primary detection circuit and the main conversion unit,
   wherein the auxiliary winding is configured to obtain an auxiliary voltage through the main conversion unit, and the primary detection circuit is configured to provide the primary voltage change value according to the auxiliary voltage.

7. The power converter in claim 1, wherein the primary detection circuit comprises:
   a resistor coupled to the primary rectifier filter circuit or the main conversion unit, and
   a voltage division component coupled to the resistor,
   wherein the voltage division component is a voltage division resistor or a capacitor, and a node between the resistor and the voltage division component is coupled to the primary-side control unit; the resistor is configured to receive a detection voltage corresponding to the input voltage, and provide the primary voltage change value through the node according to the detection voltage.

8. The power converter in claim 7, wherein the primary detection circuit further comprises:
   a diode coupled to the resistor,
   wherein the diode is configured to limit a polarity of the detection voltage.

9. The power converter in claim 1, wherein the primary detection circuit is coupled to the main conversion unit, and provides the primary voltage change value according to a primary-side current of the main conversion unit.

10. The power converter in claim 9, wherein the primary detection circuit comprises:
    a detection resistor coupled to a power switch of the main conversion unit and the primary-side control unit,
    wherein the primary-side current flows through the detection resistor to generate the primary voltage change value.

11. A power converter with over temperature protection compensation, comprising:
    a main conversion unit having a primary side, the primary side coupled to a primary rectifier filter circuit,
    a primary-side control unit coupled to the primary side,
    a primary detection circuit coupled to the primary-side control unit, and
    an over temperature adjustment circuit coupled to the primary-side control unit, comprises:
      a temperature compensation circuit coupled to the primary-side control unit,
    wherein the primary-side control unit is configured to obtain a primary voltage change value corresponding to the change in an input voltage through the primary detection circuit, and the primary-side control unit is configured to provide a current fixed value to the over temperature adjustment circuit according to the primary voltage change value; the over temperature adjustment circuit is configured to correspondingly provide a resistance change value according to the change of the input voltage, and provides a temperature control voltage according to the current fixed value and the resistance change value so that the primary-side control unit is configured to determine whether an over temperature protection is activated according to the temperature control voltage,
    wherein the temperature compensation circuit is configured to correspondingly, generate the resistance change value according to the change of the input voltage, and the input voltage received by the power converter is a wide input voltage, and
    wherein the input voltage is higher, the resistance change value provided by the temperature compensation circuit is higher, and the input voltage is lower, the resistance change value provided by the temperature compensation circuit is lower.

12. The power converter in claim 11, wherein the over temperature adjustment circuit further comprises:
    a temperature control resistor coupled to the temperature compensation circuit,
    wherein the temperature control resistor is configured to generate a temperature control resistance according to an ambient temperature; the current fixed value flows through the resistance change value and the temperature control resistance to generate the temperature control voltage.

13. The power converter in claim 12, wherein the temperature compensation circuit comprises:
    a detection circuit coupled to the primary rectifier filter circuit or the main conversion unit,
    a voltage control switch coupled to the detection circuit,
    a control unit coupled to the voltage control switch, and
    a compensation resistor coupled to the control unit,
    wherein the detection circuit is configured to receive a detection voltage corresponding to the input voltage, and provide a voltage change value according to the detection voltage; the voltage control switch is configured to provide a control signal according to the voltage change value, and the control unit is configured to adjust the resistance change value of the compensation resistor according to the control signal.

14. The power converter in claim 13, wherein the temperature compensation circuit further comprises:
a diode coupled to the detection circuit,
wherein the diode is configured to limit a polarity of the detection voltage.

* * * * *